June 21, 1938.  G. O. HARRISON  2,121,595

NETWORK DISTRIBUTION SYSTEM

Filed July 31, 1937  3 Sheets-Sheet 3

WITNESSES:

INVENTOR
George O. Harrison
BY
ATTORNEY

Patented June 21, 1938

2,121,595

UNITED STATES PATENT OFFICE 2,121,595

NETWORK DISTRIBUTION SYSTEM

George O. Harrison, Wilkinsburg, Pa., assignor to Westinghouse Electric & Manufacturing Company, East Pittsburgh, Pa., a corporation of Pennsylvania Application July 31, 1937, Serial No. 156,777

20 Claims. (Cl. 171—118)

My invention relates to alternating-current systems of transmission and distribution, and particularly to alternating-current network distribution systems in which a common network load circuit is supplied by means of a plurality of feeders from a common alternating-current power source. In such systems, each feeder is connected to the high voltage sides of a number of banks of transformers which serve to supply power to the network load circuit, and an individual automatic circuit breaker known as a network protector, is provided for controlling the power flow through each transformer bank.

It is the present usual practice to provide a polyphase power directional master relay as part of the control equipment of each network protector. This master relay serves to trip the associated network circuit breaker in the event of reverse power flow caused by a fault on the feeder or high tension circuits, and also serves to compare the magnitudes and phase relationship of the voltages existing on the supply and network sides of the network circuit breaker when the latter is open, in order to prevent closure of the circuit breaker under such conditions that power will flow in reverse direction through the network circuit breaker immediately following its closure.

In my copending application, Serial No. 156,776, filed July 31, 1937, and assigned to the Westinghouse Electric & Manufacturing Company, there is disclosed a system for the control of network circuit breakers, in which a separate fault responsive relay or trip device is provided for opening the network circuit breaker under fault conditions, and a control relay is provided for controlling the open or closed condition of the network circuit breaker from the central station or sub-station which supplies the corresponding feeder. In accordance with the principle disclosed in the above-mentioned application, a signal is transmitted from the station or sub-station over a suitable communication channel, such as a carrier current channel or a separate pilot wire, to the various network protectors. The signal so transmitted is timed to indicate the phase of station or sub-station voltage, and serves to control either the opening or closing of all of the network protectors supplied from a particular feeder, depending upon the phase angle position of the signal impulses as compared to the source voltage.

The signal also serves to provide an indication of phase angle suitable for "phasing" or identification of the phase position of the voltages transmitted through the feeder conductors in order to prevent closure of the network protectors if any feeder conductors have become accidentally transposed. Such transposition of feeder conductors may arise in repairing a feeder fault, and must be corrected before the network protectors are closed, as otherwise a condition equivalent to a permanent short circuit will be established.

It is an object of the present invention to provide an improvement upon the system disclosed in the above-mentioned application, by the use of suitable electronic devices which serve to reduce the power losses required for operation of the control apparatus, and to reduce the cost of the installation.

Other objects of my invention will become evident from the following detailed description taken in conjunction with the accompanying drawings, in which.

Figures 1, 2, 3, 4, 5:
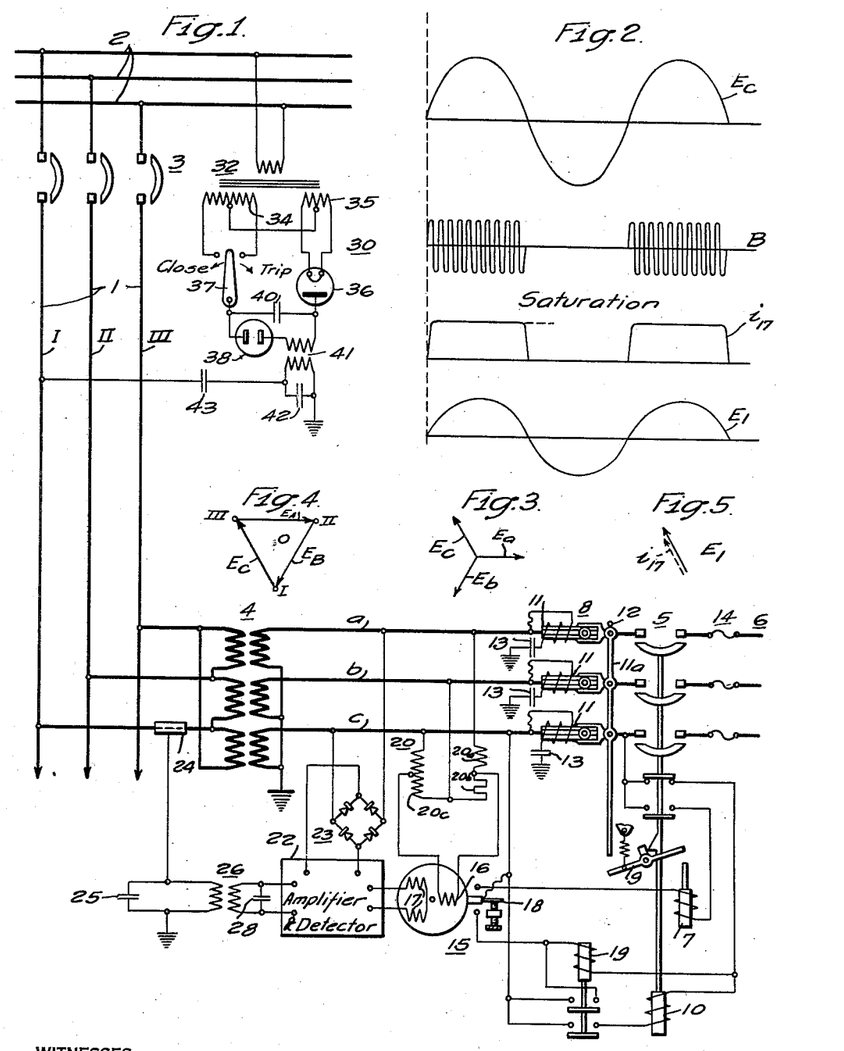
Figure 1 is a diagrammatic view of a network system embodying my invention.
Fig. 2 is a coordinate diagram with time abscissa, illustrating the operation of the electronic apparatus shown in Fig. 1.
Figs. 3, 4 and 5 are vector diagrams showing the phase relationship of power frequency variables appearing in the circuit shown in Fig. 1.

Referring to Fig. 1 in detail, a polyphase feeder 1, comprising feeder conductors I, II and III, is arranged to be connected to a station or sub-station supply bus, 2, preferably three-phase with grounded-neutral in accordance with the usual practice, by means of a feeder circuit breaker 3. The feeder 1, which may be an overhead line but which more commonly would be a high voltage cable, is connected to the high voltage sides of a number of step-down transformer banks, one of which is indicated at 4.

The transformer bank 4 preferably has its primary or high voltage windings connected in delta to the feeder 1, and has its secondary windings connected in star with neutral grounded, in accordance with the usual practice. A network circuit breaker 5 is interposed between the secondary terminals of the transformer bank 4 and the network load circuit 6, for controlling the power flow through the transformer bank 4.

The network circuit breaker 5 is provided with a shunt trip device 7 and with a power-directional direct-trip device 8, both of which act upon a common trip lever 9, so that the circuit breaker 5 may be opened upon proper energization of either the trip device 7 or the direct trip device 8. The network circuit breaker 5 is provided with the usual closing motor or solenoid 10, which serves to effect closure of the circuit breaker automatically under predetermined system conditions.

The direct-trip device 8 is preferably of the type disclosed in my prior Patent No. 2,077,321, granted April 13, 1937, and assigned to the Westinghouse Electric & Manufacturing Company. This device comprises an individual magnet 11 for each secondary phase conductor of the transformer bank 4, each potential magnet 11 being pivoted to the corresponding bus bar in such manner as to rotate in a plane parallel to the face of the bus bar. The potential magnets 11 are connected mechanically by means of a tie rod 11a, which serves to operate the latch 9 upon the occurrence of reverse power flow of fault magnitude and are normally held in a position substantially parallel to the corresponding bus bar, by means of a suitable stop 12.

The coils of each of the potential magnets 11 are connected between the corresponding bus bar and ground in series with a capacitor 13, whose reactance is such as to approximately neutralize the inductive reactance of the coil itself. With such a design of the capacitors 13, the current in the potential magnet coils will be approximately in phase with the current in the corresponding bus bar for non-inductive loads, and the direct trip device 8 will respond approximately to true power flow or watts. It will be understood that the resistance of the coils of magnets 11 is so high that resonance phenomena are not present to any objectionable degree. If a rotated characteristic of the direct trip device 8 is desired, this characteristic may be secured by modifying the design of the potential coils or the capacitance of the capacitors 13 so that a capacitive or inductive reactance differential is present in each circuit.

A set of back-up fuses 14 is interposed between the network circuit breaker 5 and the network load circuit 6. The fuses 14 are preferably designed to blow at a current value of the order of 200 or 300% of the normal full load current of the associated transformer bank 4 in accordance with the usual practice.

An induction type control relay 15 is provided for controlling the open or closed condition of the network circuit breaker 5, depending upon the time of the signal transmitted over the communication channel. The control relay 15 may be of any suitable type having a conducting disk or drum acted upon by a potential coil 16 and a pair of additional coils 17, which are angularly displaced from the potential coil in the direction of rotation of the disk or drum. The relay 15 is provided with an adjustable biasing spring 18 which opposes movement of the relay armature to its closing position.

The potential coil 16 is connected to a positive sequence voltage filter 20 to be energized in accordance with the positive phase sequence components of the secondary voltage of the transformer bank 4. The phase sequence filter 20 comprises an auto-transformer 20c having a 40% tap and a reactor 20a and resistor 20b which have a combined lagging phase angle of 60°. The resistor 20b is so designed with reference to the reactor 20a that the voltage drop across the resistor is 40% of the total voltage impressed upon the reactor 20a and the resistor 20b in series, and lags this total voltage by a phase angle of 60°. With such design of the phase sequence filter 20, and with its terminals connected to the secondary leads of the transformer bank 4 in the order indicated by the reference characters a, b and c, the output voltage developed by the phase sequence filter 20 will be proportional to the positive sequence transformer secondary voltage, and will be in phase with the voltage to ground of the c-phase secondary voltage of the transformer bank 4, as is well understood in the art.

The coils 17 of the control relay 15 are connected to the output terminals of a suitable amplifier and detector unit 22, to be energized when the carrier signal is supplied to the latter unit. The amplifier and detector unit 22 may comprise one or more electronic tubes (not shown), and is preferably so designed that its last stage is saturated when the carrier signal is received. With this design of the amplifier 22, the entire emission current of the last stage is circulated through the coils 17, whenever the carrier signal is received, and the current flow in the latter coils is of constant magnitude irrespective of variations of signal strength.

The control relay 15 is adjusted so that closure of its closing contacts against the action of the spring 18 can occur only when the relay torque is at least 75% of the value developed when the potential coil 16 is energized by the normal output voltage of the positive sequence filter 20, and the coils 17 carry pulsating current in phase with such normal voltage and having the maximum magnitude, as limited by saturation of the last stage of the amplifier and detector unit 22. The control relay 15 is also biased to neutral position by means of a weak spiral spring (not shown) so that a slight reverse torque is necessary to move the relay armature from its neutral position to tripping position.

The amplifier and detector unit 22 is energized from the secondary terminals of the transformer bank 4 by means of a source of direct-current, such as a full wave rectifier 23, preferably of the copper oxide type.

The input terminals of the amplifier and detector unit 22 are coupled to the high voltage side of the transformer bank 4 by means of a suitable coupling device such as a coupling capacitor 24, which may take the form of a simple tubular conductor surrounding one of the incoming transformer leads. The coupling capacitor 24 is connected to ground through a tuned circuit consisting of a tuning capacitor 25 and the input winding of an inductive coupler 26. The secondary winding of the inductive coupler 26 is preferably connected to a tuning capacitor 28 to provide a tuned circuit having the same natural frequency as the tuned circuit which includes the tuning capacitor 25, and the carrier current source which will hereinafter be described. The inductor coupler 26 provides loose coupling between the two tuned circuits which it connects.

At the supply end of the feeder 1, a source of carrier wave trains 30 is provided for impressing suitable closing and tripping signals upon the feeder. The carrier current source 30 is preferably of the type known in the art as a spark gap oscillator, and is energized from a suitable transformer 32 having a secondary plate winding 34 which develops a relatively high voltage to be impressed upon an electronic discharge device 38, and having a secondary filament voltage winding 35, which develops a suitable low voltage for energization of the filament of a rectifier tube 36. The windings 34 and 35 are provided with mid taps which are connected together, and a double pole switch 37 is provided for connecting the free terminals of the winding 34 to an oscillatory circuit consisting of the electronic discharge device 38, the primary winding of an inductive coupler 41, and a tuning capacitor 40.

It will be noted that the spark gap oscillator 30 serves as a source of carrier frequency energy modulated at the power frequency. Obviously any other form of apparatus for producing modulated carrier frequency energy may be substituted for the source 30.

The secondary winding of the inductive coupler 41 is connected to a tuning capacitor 42 to constitute a tuned circuit therewith, and the tuned circuit so formed is connected to a conductor of the feeder 1 by means of a suitable coupling capacitor 43. As mentioned above, the natural frequency of the tuned circuits in the oscillator 30 is the same as that of the tuned circuits of the individual network protectors.

The electric discharge device 38 is preferably a gas-filled, enclosed device designed to break down at a voltage of the order of 200 or 300 volts, but may be an open gap designed to break down at a much higher voltage. The rectifier 36 is designed to pass all current necessary for oscillatory operation of the electric discharge device 38 during one-half of the full cycle of voltage developed by the transformer 32, and to block the passage of current during the reverse half cycle of transformer secondary voltage.

The oscillator 30 is connected to be energized by the star or delta voltage of the supply bus 2 which will produce a phase position of the carrier wave trains such that the torque of the control relay 15 will be maximum for the normal phase angle of current in the potential coil 16. The method of ascertaining the correct phase angle of voltage for energization of the oscillator 30 may be outlined as follows, referring to Figs. 3, 4 and 5. Denoting the phase-to-ground secondary voltages of the transformer bank 4 by a system of vectors such as $E_a$, $E_b$ and $E_c$ of Fig. 3, the corresponding delta of primary voltages existing on the feeder side of transformer bank 4 may be represented on a reduced scale as the system of vectors $E_A$, $E_B$ and $E_C$ of Fig. 4. On the latter figure, the potentials of the three feeder conductors I, II and III are indicated by reference numerals, and ground potential is indicated at point O.

For the connections of the positive sequence filter 20 shown, the output voltage of the filter is in phase with the c-phase transformer secondary voltage $E_c$. The output voltage of the positive sequence filter 20 is indicated by the vector $E_1$ of Fig. 5. Referring to Fig. 4, the star or delta primary voltage of the feeder 1 in phase with the sequence potential $E_1$ is the delta voltage $E_C$, and the oscillator 30 is accordingly energized from the corresponding delta phase of supply bus 1. The phase position of the fundamental frequency alternating-current component of the current circulated through the current coils 17 is indicated at $i_{17}$ of Fig. 5.

The operation of the above-described apparatus may be set forth as follows: Assuming that the station bus 2 is energized by a voltage of normal magnitude and phase relationship, the feeder 1 may be energized by closing the feeder circuit breaker 3. Upon closure of the feeder circuit breaker 3, the transformer banks connected to the feeder 1, such as transformer bank 4, are energized and develop secondary voltages of normal magnitude and phase relationship. The positive sequence filter 20 is accordingly energized and develops its maximum value of secondary voltage. As the coils 17 of the control relay 15 are deenergized, however, the torque developed by the control relay 15 is substantially zero, and the armature of the latter relay remains in its neutral position.

In order to effect closure of the network circuit breaker 5, the double pole switch 37 is moved to its close position. Upon movement of the switch 37 to its close position, the spark gap oscillator 30 commences to oscillate, and carrier currents are transmitted through the coupling device 43 to the feeder 1 during one-half cycle of voltage existing between the feeder conductors I and III. Referring to Fig. 2, the delta voltage between the feeder conductors I and III is indicated by the upper sinusoidal curve $E_C$, and the carrier signal trains which are developed during alternate half cycles of the feeder voltage is indicated at B.

The carrier current supplied to the feeder 1 is transmitted over the feeder cable to the coupling capacitors such as 24, associated with the individual network protectors, and from such coupling capacitors is transmitted to the amplifier and detector units such as 22, where it is transformed to flat-top direct-current impulses such as indicated at $i_{17}$ in Fig. 2. The flat tops of the current impulses shown at $i_{17}$ in Fig. 2, result from the saturation of the last stage of the amplifier and detector unit 22, as mentioned above.

Assuming that the connections of the conductors of feeder 1 are all correct, the fundamental frequency alternating current component of the flat top impulses $i_{17}$ of Fig. 2 will be approximately in phase with the alternating voltage impressed upon the potential coil 16 of the control relay 15, which voltage is indicated by the sinusoidal curve $E_1$ of Fig. 2. Under these conditions, the control relay 15 develops its maximum torque, and operates to complete a circuit for the contactor 19. Upon energization of the contactor 19, the latter operates to its closed position thereby completing a holding circuit for itself and completing a closing circuit for the closing solenoid 10 of the circuit breaker 5. The circuit breaker 5 accordingly closes to connect the transformer bank 4 to the network load circuit 6.

If a fault occurs on the network load circuit 6, power flows from the feeder circuit 1 through the transformer bank 4 and through all other transformer banks connected to the network load circuit 6, to the fault, and the latter is burned off in the usual manner.

If a fault occurs on the feeder 1, power flow of large magnitude occurs from the network load circuit 6, in reverse direction through the transformer bank 4 to the fault. The reverse power flow in the secondary leads of the transformer bank 4 produces a tripping torque in the direct trip device 8, and the latter operates to trip the latch 9 and thereby to effect opening of the circuit breaker 5. At the same time, the protective devices for the feeder circuit breaker 3 operate to effect opening of the latter, and upon operation of all the network protectors connected to the feeder 1, the latter is entirely disconnected.

The circuit breaker 5 may be reclosed, and will remain closed if the fault has cleared, but in the event that the feeder fault has not cleared, the circuit breaker 3 will again trip open, disconnecting the feeder, and the feeder fault should then be repaired.

If in repairing the feeder fault, any two conductors of the feeder are transposed, upon re-energization of the feeder 1 by closure of the feeder breaker 3, a negative sequence voltage will be impressed upon the phase sequence filter 20, and the output voltage developed by the latter will accordingly be substantially zero. Under these conditions, the control relay 15 will remain open.

If in repairing the fault on feeder 1, all three conductors of the feeder are rotated 120 electrical degrees or 240 electrical degrees, the voltage developed by the phase sequence filter 20 will be of approximately normal value but will be rotated 120° or 240° from its normal phase position. If, under these conditions, the double pole switch 37 is operated to its close position, the carrier signals impressed upon the feeder 1 will be of such phase relationship that the control relay 15 will develop a tripping torque. It will be seen that the control relay 15 will either fail to develop torque or will develop a tripping torque under all conditions which involve transposition of any of the conductors of feeder 1.

With the feeder circuit breaker 3 closed and the network circuit breaker 5 closed, the feeder 1 may be removed from service by first opening the feeder circuit breaker 3 and thereafter operating the double pole switch 37 to trip position. Upon operation of switch 37 to trip position, the carrier impulses transmitted over the feeder 1 occur during the reverse half cycles of secondary voltage of the transformer 32, and the torque developed by the control relay 15 is of maximum magnitude but acting in the tripping direction. The shunt trip device 7 is accordingly operated to open the network circuit breaker 5.

Figures 6, 7, 8:
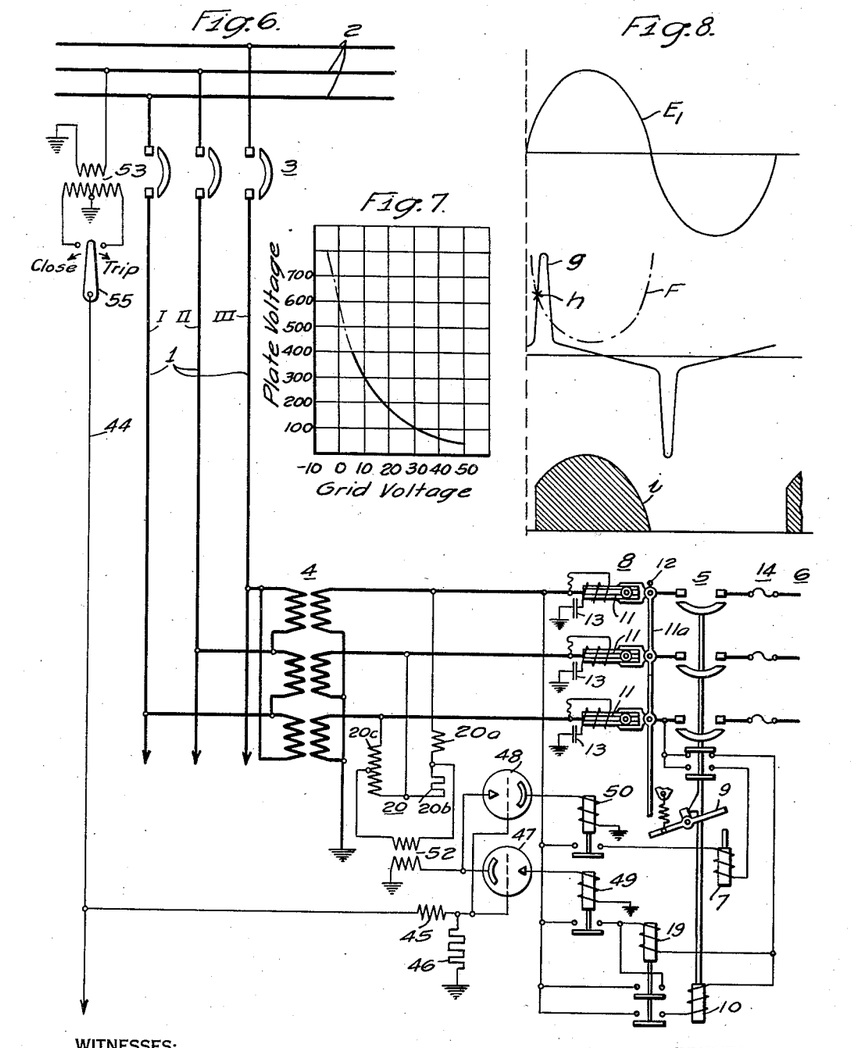
Fig. 6 is a diagrammatic view of a pilot wire modification of the system shown in Fig. 1.
Fig. 7 is a coordinate diagram showing the relationship of plate voltage and grid voltage for an electronic device which may be used in the system of Fig. 6.
Fig. 8 is a coordinate diagram, similar to Fig. 2, but illustrating the operation of the system shown in Fig. 6.

Fig. 6 shows a modification of the invention in which a pilot wire communication channel is substituted for the carrier channel of Fig. 1, and in which grid glow tubes are substituted for the control relay of the Fig. 1 modification. Referring to Fig. 6, the feeder 1, station bus 2, feeder circuit breaker 3, transformer bank 4, network circuit breaker 5, and network load circuit are laid out and connected in the same manner as in Fig. 1.

A pilot wire 44 extends from the central station or substation from which the feeder 1 is energized to all of the network protectors supplied from the feeder 1. A series inductance 45 and a shunt resistor 46 are preferably provided as part of the equipment for each network protector, for shifting the phase of voltage derived from the pilot wire 44 through a small angle of the order of 10 to 20 degrees, for a purpose which will hereinafter appear. The free terminal of the pilot wire, at each network protector, is connected to the control elements of a closing grid glow tube 47 and a tripping grid glow tube 48.

The pilot wire 44 is connected to a double pole switch 55 which serves to selectively establish connection of the pilot wire to either secondary terminal of a peaking transformer 53. The peaking transformer 53 is of a well-known saturated design such as to provide a peaked secondary voltage, and is wound to develop a low secondary voltage having a crest value of the order of 50 to 100 volts, depending upon the characteristics of the grid glow tubes used. For the tubes hereinafter described, a crest value of 50 volts would be suitable. The peaking transformer 53 is connected to the station bus 1 in such manner as to develop its voltage peak a few electrical degrees after the zero point of anode-cathode voltage applied to the grid glow tubes 47 and 48.

The anode-cathode circuits of the grid glow tubes 47 and 48 are connected in series with a closing relay 49 and a tripping relay 50, respectively, and the two circuits thus formed are connected in parallel, but in opposite directions, to the secondary terminals of a plate supply transformer 52. The latter transformer is energized from a positive phase sequence filter 20 similar to that described in connection with Fig. 1.

The grid glow tubes 47 and 48 are of the type in which the control elements are operated in the so-called positive range, a typical example of the firing characteristics of such tubes being illustrated by the curve of Fig. 7. In Fig. 7, the grid voltage at which the tube breaks down, is plotted as abscissae, and the corresponding plate voltage is plotted as ordinates. It will be seen from this curve that when the plate voltage is high, for example, at 400 volts, the grid voltage required to fire the tube is small, at the particular value mentioned, 5 volts. As the plate voltage decreases, the grid voltage required to fire the tube increases to a maximum of approximately 50 volts, which is required when the plate voltage is at a value of 50 volts. With plate voltages below 50 volts, the tube cannot be fired. The grid glow tubes 47 and 48 have the usual characteristic of gas-filled tubes, of remaining conducting, after having been fired, until a zero point of plate current is reached, when the initial firing characteristic is restored.

When the phase voltages developed at the secondary terminals of the transformer bank 4 are of normal magnitude and phase relationship, the phase sequence filter 20 segregates a positive symmetrical component of voltage, which is of sinusoidal form, and a corresponding normal sinusoidal voltage is applied to the plate circuits of the grid glow tubes 47 and 48.

Referring to Fig. 8, the sinusoidal voltage applied to the plate circuits of one of the tubes 47 or 48, when the apparatus is in operation, is indicated by the curve $E_1$. The corresponding instantaneous values of grid voltage required to break down the tube are plotted as a discontinuous curve, shown at F. The peaked secondary voltage of the peaking transformer 53, lagged slightly by the action of the reactor 45 and the resistor 46, is indicated at $g$.

The operation of the apparatus shown in Fig. 6 may be set forth as follows: In order to energize the network load circuit 6, the feeder circuit breaker 3 is first closed, which provides voltage acting upon the plate circuits of the grid-glow tubes 47 and 48, as will be obvious from the preceding description. Neither of the tubes 47 nor 48 break down in response to the plate voltage impressed thereon, however, as the grid voltage of both tubes is zero. The double pole switch 55 is now operated to close position, and the pilot wire 44 is energized and transmits a voltage to the grids of the two tubes 47 and 48. The voltage impressed upon the grid of the tripping tube 48 has no effect at this time, as the positive peaks of grid voltage occur during the half cycle when the anode of the tube is negative with reference to the cathode. The voltage peaks applied to the grid of the closing tube 47, however, occur while the anode of the latter tube is positive with reference to the cathode, and these peaks are of sufficient value to cause the tube to break down at an early point in its cycle such as indicated at $h$ in Fig. 8.

In response to the anode current passed by the closing tube 47, (indicated by the shaded area $i$ of Fig. 8), the closing relay 49 operates to complete a circuit for the contactor 19, and the latter closes the network circuit breaker 5 in the manner explained in connection with Fig. 1.

In order to trip the network circuit breaker 5 from the central station, the double pole switch 55 is moved to its trip position, and the pilot wire voltage is shifted through a phase angle of 180°, which causes breakdown of the tripping tube 48 rather than the closing tube 47, as will be obvious.

Figures 9, 10:
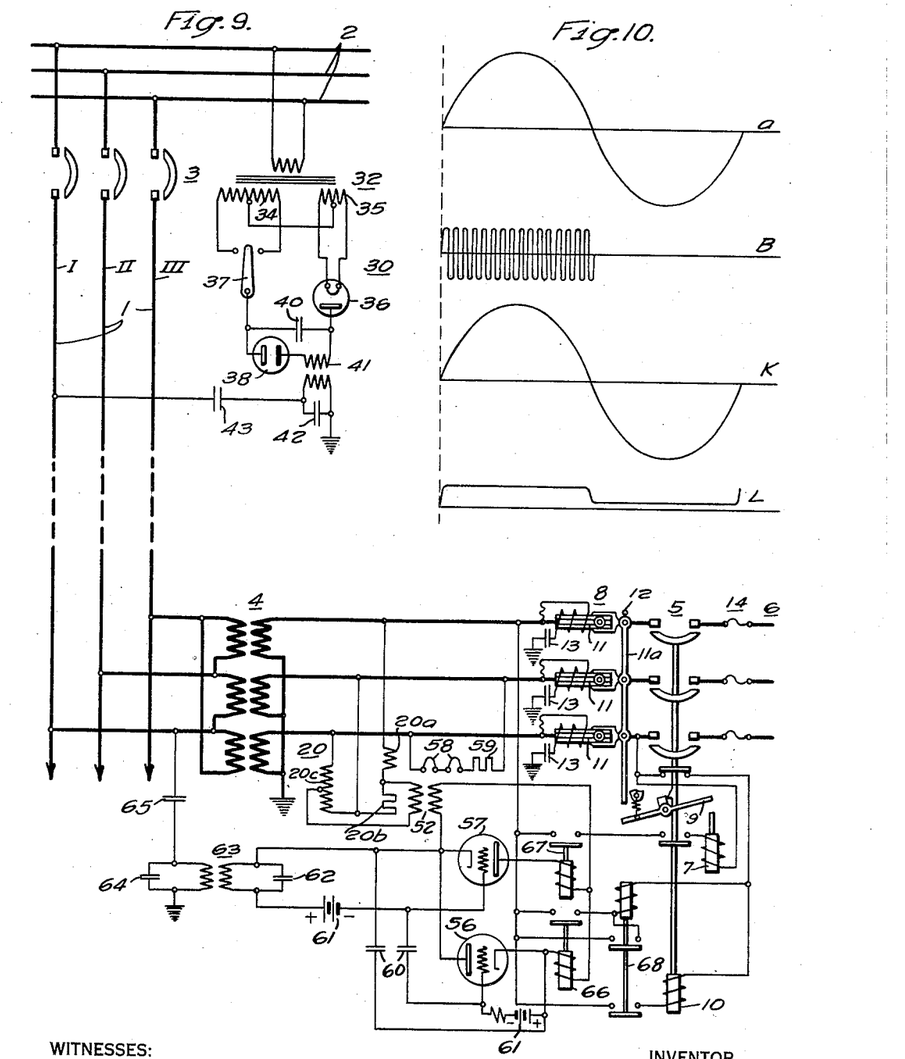
Fig. 9 is a diagrammatic view of a modification of the system shown in Fig. 1, in which electronic detectors are used as the sensitive control elements.
Fig. 10 is a coordinate diagram similar to Figs. 2 and 8, showing the operation of electronic devices utilized in the system of Fig. 9.

Fig. 9 shows a modification in which a carrier channel similar to that of Fig. 1 is provided, but in which the control relay of Fig. 1 is eliminated, and a pair of detector-type high-vacuum tubes are substituted. Referring to Fig. 9, the feeder 1, supply bus 2, feeder circuit breaker 3, transformer bank 4, network circuit breaker 5, and network load circuit 6 are connected in the same manner as the corresponding elements of Figs. 1 and 6. A spark gap oscillator 30, similar to the corresponding element of Fig. 1, is associated with the feeder 1 at the station or substation from which the latter is supplied.

The detector tubes 56 and 57 are connected in series with a closing relay 66 and a tripping relay 67, respectively, and the two circuits thus formed are connected in parallel to the secondary terminals of a plate supply transformer 52, similarly to the corresponding plate circuits of Fig. 6. The grids of the detector tubes 56 and 57 are biased by means of suitable bias batteries 61, or equivalent, and are energized by means of suitable tuned circuits from the high potential side of the transformer bank 4. The two circuits may comprise a pair of tuning capacitors 62 and 64, and an inductive coupler 63, designed and connected in the same manner as the elements of Fig. 1 having corresponding function, and connected to the feeder 1 by means of a suitable coupling capacitor 65. The grid of one tube, such as that of tube 57, may be directly connected to the tuned circuit apparatus, and the grid circuit of the other tube 56 may be energized through suitable coupling capacitors 60.

The detector tubes 56 and 57 are preferably of the highly exhausted or hard type, having hot cathodes preferably heated by means of electrically insulated heaters 58 shown, for convenience, in a separate circuit from the tubes. A resistor 59 is included in series with the heaters 58.

The two tubes 56 and 57 are normally blocked by the biasing batteries 61, and pass current only when the carrier signal is received. The carrier signal trains arrive at proper time intervals to cause one or the other of tubes 56 or 57 to pass current, depending upon whether the double pole switch 37 is in its close or its trip position. The operation of Fig. 9 modification will otherwise be obvious from that described above in connection with Figs. 1 and 6.

The plate current passed by the detector tubes 56 or 57 is of the form indicated at L in Fig. 10, the corresponding anode voltage being indicated at K, and the carrier wave train at B. The sinusoidal curve $a$ indicates the phase of voltage developed in the secondary windings of the transformer 32 which energizes the spark gap oscillator.

It will be understood that the direct-trip device 8, shown in Figs. 1, 6 and 9, serves merely to trip the network circuit breaker 5 in the event of a fault on the feeder 1, and may be replaced by any other relay, device or apparatus, of which there are a number known in the art, capable of performing the same function. Similarly, the grid glow tubes 47 and 48 of Fig. 6 are representative of the class of controlled electric discharge devices, i. e., electric discharge devices having control elements capable of initiating, modifying or controlling the flow of current in one or more cathode-anode discharge paths. Obviously, a number of full equivalents of the tubes 47 and 48 are known in the art. The detectors 56 and 57 may be replaced by any electronic devices capable of detecting carrier wave trains.

I do not intend that the present invention shall be restricted to the specific structural details, arrangement of parts, or circuit connections herein set forth, as various modifications thereof may be effected without departing from the spirit and scope of my invention. I desire, therefore, that only such limitations shall be imposed as are indicated in the appended claims.

I claim as my invention:

1. In an alternating-current system of transmission and distribution, a source of periodically varying voltage located at a station, a power circuit energized from said source and extending to a remote location, a circuit breaker connected to said circuit at said remote location, means constituting a communication channel extending from said station to said circuit breaker, means for impressing periodically repeated signals upon said communication channel, said signals having a fixed time relationship to the variations of voltage of said source, and control apparatus for said circuit breaker including an electric discharge device having a control element, means for energizing said control element in accordance with said repeated signals, and means controlled by the discharge current of said device for effecting closure of said circuit breaker when a predetermined time relationship of the transmitted signals and the transmitted variations of voltage of said circuit exists.

2. In an alternating-current system of transmission and distribution, a source of periodically varying voltage located at a station, a power circuit energized from said source and extending to a remote location, a circuit breaker connected to said circuit at said remote location, means constituting a communication channel extending from said station to said circuit breaker, means for impressing periodically repeated signals upon said communication channel, said signals having a fixed time relationship to the variations of voltage of said source, and control apparatus for said circuit breaker including an electric discharge device having a control element, means for energizing said control element in accordance with said repeated signals, and means controlled by the discharge current of said device for effecting opening of said circuit breaker when a predetermined time relationship of the transmitted signals and the transmitted variations of voltage of said circuit exists.

3. In an alternating-current system of transmission and distribution, a source of periodically varying voltage located at a station, a power circuit energized from said source and extending to a remote location, a circuit breaker connected to said circuit at said remote location, means constituting a communication channel extending from said station to said circuit breaker, means for selectively impressing periodically repeated closing signals or periodically repeated tripping signals upon said communication channel, said closing signals having a fixed time relationship to the variations of voltage of said source, and said tripping signals having a different fixed time relationship to the variations of voltage of said source, and control apparatus for said circuit breaker including electric discharge means having control means, means for energizing said control means in accordance with said repeated signals, and means controlled by the discharge current of said discharge means for effecting closure of said circuit breaker when a predetermined time relationship of the transmitted closing signals and the transmitted variations of voltage of said circuit exists, and for effecting opening of said circuit breaker when a predetermined different time relationship of the transmitted tripping signals and the transmitted variations of voltage of said circuit exists.

4. In a network protector for controlling the flow of power in a polyphase alternating-current circuit, a network circuit breaker, and control means for said circuit breaker, including a closing circuit, sequence means for segregating a symmetrical component of a polyphase system of voltages of said circuit, an electric discharge device having an anode, a control electrode and an output electrode, means for energizing one of said electrodes in accordance with the segregated symmetrical component, means for energizing the other of said electrodes in accordance with a phasing voltage having a predetermined normal phase relationship to said polyphase system of voltages, and means responsive to a predetermined condition of electric discharge between said anode and said output electrode for effecting a control operation in said closing circuit.

5. In a network protector for controlling the flow of power in a polyphase alternating-current circuit, a network circuit breaker, and control means for said circuit breaker including a closing circuit, sequence means for segregating a positive symmetrical component of a polyphase system of voltages of said circuit, an electric discharge device having an anode, a control electrode and an output electrode, means for energizing one of said electrodes in accordance with the segregated symmetrical component, means for energizing the other of said electrodes in accordance with a phasing voltage having a normal phase relationship to the segregated voltage of said sequence means such as to produce relatively large current flow between said anode and said output electrode, and means responsive to a relatively large current flow between said anode and said output electrode for effecting energization of said closing circuit.

6. In an alternating-current network system of distribution, a feeder circuit, a network load circuit, a transformer for supplying power from said feeder circuit to said network load circuit, a network circuit breaker for controlling the flow of power through said transformer, means for impressing carrier wave trains upon said feeder circuit at a predetermined point in the cycle of power voltage supplied to the feeder circuit, electronic means for amplifying and detecting said carrier wave trains, and means responsive to the output of said electronic means and the transmitted power voltage of said feeder circuit for effecting closure of said circuit breaker when a predetermined relationship of said output and said transmitted voltage exists.

7. In an alternating-current network system of distribution, a feeder circuit, a network load circuit, a transformer for supplying power from said feeder circuit to said network load circuit, a network circuit breaker for controlling the flow of power through said transformer, means for impressing carrier wave trains upon said feeder circuit at a predetermined point in the cycle of power voltage supplied to the feeder circuit, electronic means for amplifying and detecting said carrier wave trains, and means responsive to the output of said electronic means and the transmitted power voltage of said feeder circuit for effecting opening of said circuit breaker when a predetermined relationship of said output and said transmitted voltage exists.

8. In an alternating-current network system of distribution, a feeder circuit, a network load circuit, a transformer for supplying power from said feeder circuit to said network load circuit, a network circuit breaker for controlling the flow of power through said transformer, means for selectively impressing closing carrier wave trains or opening carrier wave trains upon said feeder circuit, said closing carrier wave trains being impressed at a predetermined point in the cycle of power voltage supplied to the feeder circuit, and said opening carrier wave trains being impressed at a different point in said cycle, electronic means for amplifying and detecting said carrier wave trains, and control means responsive to the output of said electronic means and an alternating voltage condition derived from one of said circuits for effecting closure of said circuit breaker when a predetermined relationship of said output and voltage condition exists, said control means being responsive to a different relationship of said output voltage and an alternating voltage condition derived from one of said circuits for effecting opening of said circuit breaker.

9. In an alternating-current network system of distribution, a feeder circuit, a network load circuit, a transformer for supplying power from said feeder circuit to said network load circuit, a network circuit breaker for controlling the flow of power through said transformer, means for selectively impressing closing carrier wave trains or opening carrier wave trains upon said feeder circuit, said closing carrier wave trains being impressed at a predetermined point in the cycle of power voltage supplied to the feeder circuit, and said opening carrier wave trains being impressed at a different point in said cycle, electronic means for amplifying and detecting said carrier wave trains, and control means responsive to the output of said electronic means and the transmitted voltage of said feeder circuit for effecting closure of said circuit breaker when a predetermined relationship of said output and transmitted voltage exists, said control means being responsive to a different relationship of said output voltage and said transmitted voltage for effecting opening of said circuit breaker.

10. In an alternating-current network system of distribution, a polyphase feeder circuit, a polyphase network load circuit, transformer means for supplying power from said feeder circuit to said network load circuit, a network circuit breaker for controlling the flow of power through said transformer means, means for impressing carrier wave trains upon said feeder circuit at a predetermined point in the cycle of power voltage supplied to the feeder circuit, electronic means for amplifying and detecting said carrier wave trains, sequence means for segregating a positive symmetrical component of the polyphase voltage transmitted by said feeder circuit, and means responsive to the output of said electronic means and the segregated voltage of said sequence means for effecting closure of said circuit breaker when a predetermined relationship of said output and said segregated voltage exists.

11. In an alternating-current network system of distribution, a polyphase feeder circuit, a polyphase network load circuit, transformer means for supplying power from said feeder circuit to said network load circuit, a network circuit breaker for controlling the flow of power through said transformer means, means for impressing carrier wave trains upon said feeder circuit at a predetermined point in the cycle of power voltage supplied to the feeder circuit, electronic means for amplifying and detecting said carrier wave trains, sequence means for segregating a positive symmetrical component of the polyphase voltage transmitted by said feeder circuit, and an induction type relay responsive to the output of said electronic means and the segregated voltage of said sequence means for effecting closure of said circuit breaker when a predetermined phase relationship of said output and said segregated voltage exists.

12. In an alternating-current network system of distribution, a polyphase feeder circuit, a polyphase network load circuit, transformer means for supplying power from said feeder circuit to said network load circuit, a network circuit breaker for controlling the flow of power through said transformer means, means for selectively impressing closing carrier wave trains or opening carrier wave trains upon said feeder circuit, said closing carrier wave trains being impressed at a predetermined point in the cycle of power voltage supplied to the feeder circuit, and said opening carrier wave trains being impressed at a different point in said cycle, sequence means for segregating a positive symmetrical component of the polyphase voltage transmitted by said feeder circuit, and an induction type control relay responsive to the output of said electronic means and the segregated voltage of said sequence means for effecting closure of said circuit breaker when a predetermined relationship of said output and said segregated voltage exists, and for effecting opening of said circuit breaker when a different predetermined relationship of said output and said segregated voltage exists.

13. In an alternating-current network system of distribution, a feeder circuit, a network load circuit, a transformer for supplying power from said feeder circuit to said network load circuit, a network circuit breaker for controlling the flow of power through said transformer, and control means for said network circuit breaker including a closing circuit, a gas-filled electric discharge device having an anode, a control electrode and an output electrode, means for energizing one of said electrodes in accordance with a voltage condition derived from the transformer end of said feeder circuit, means for energizing the other of said electrodes in accordance with a phasing voltage having a predetermined normal phase relationship to said voltage condition, and means responsive to a predetermined condition of electric discharge between said anode and said output electrode for effecting a control operation in said closing circuit.

14. In an alternating-current network system of distribution, a feeder circuit, a network load circuit, a transformer for supplying power from said feeder circuit to said network load circuit, a network circuit breaker for controlling the flow of power through said transformer, a pilot-wire extending to said network circuit breaker, means for energizing said pilot wire in accordance with an alternating voltage having a fixed phase relationship to the alternating voltage supplied to said feeder circuit, and control means for said network circuit breaker including a closing circuit, a gas-filled electric discharge device having an anode, a control electrode and an output electrode, means for energizing one of said electrodes in accordance with a voltage condition derived from the transformer end of said feeder circuit, means for energizing the other of said electrodes in accordance with the voltage of said pilot wire, and means responsive to a predetermined condition of electric discharge between said anode and said output electrode for effecting a control operation in said closing circuit.

15. In an alternating-current network system of distribution, a polyphase feeder circuit, a polyphase network load circuit, transformer means for supplying power from said feeder circuit to said network load circuit, a network circuit breaker for controlling the flow of power through said transformer means, a pilot-wire extending to said network circuit breaker, means for energizing said pilot wire in accordance with an alternating voltage having a fixed phase relationship to the alternating voltage supplied to said feeder circuit, and control means for said network circuit breaker including a closing circuit, a gas-filled electric discharge device having an anode, a control electrode and an output electrode, sequence means for segregating a positive symmetrical component of the polyphase voltage transmitted by said feeder circuit, means for energizing one of said electrodes in accordance with the voltage of said pilot wire, means for energizing the other of said electrodes in accordance with the output voltage of said sequence means, and means responsive to a predetermined condition of electric discharge between said anode and said output electrode for effecting a control operation in said closing circuit.

16. In an alternating-current network system of distribution, a feeder circuit, a network load circuit, a transformer for supplying power from said feeder circuit to said network load circuit, a network circuit breaker for controlling the flow of power through said transformer, means for impressing carrier wave trains upon said feeder circuit at a predetermined point in the cycle of power voltage supplied from the feeder circuit, a detector-type discharge device having a plate circuit and a control circuit, means for energizing said plate circuit in accordance with transmitted power voltage of said feeder circuit, means for energizing said control circuit in accordance with the transmitted carrier wave trains, and means responsive to a predetermined condition of current flow in said plate circuit for effecting closure of said network circuit breaker.

17. In an alternating-current network system of distribution, a feeder circuit, a network load circuit, a transformer for supplying power from said feeder circuit to said network load circuit, a network circuit breaker for controlling the flow of power through said transformer, means for impressing carrier wave trains upon said feeder circuit at a predetermined point in the cycle of power voltage supplied from the feeder circuit, a detector-type discharge device having a plate circuit and a control circuit, means for energizing said plate circuit in accordance with transmitted power voltage of said feeder circuit, means for energizing said control circuit in accordance with the transmitted carrier wave trains, and means responsive to a predetermined condition of current flow in said plate circuit for preventing closure of said network circuit breaker.

18. In an alternating-current network system of distribution, a feeder circuit, a network load circuit, a transformer for supplying power from said feeder circuit to said network load circuit, a network circuit breaker for controlling the flow of power through said transformer, means for impressing closing carrier wave trains or tripping carrier wave trains upon said feeder circuit, said closing wave trains having a fixed time relationship to the alternating voltage supplied to said feeder circuit and said tripping wave trains having a different fixed time relationship to said alternating voltage, a closing detector-type discharge device having a plate circuit and a control circuit, a tripping detector-type discharge device having a plate circuit and a control circuit, means for energizing said plate circuits in accordance with power voltage transmitted by said feeder circuit, means for energizing said control circuits in accordance with the transmitted carrier wave trains, means responsive to a predetermined condition of current flow in the plate circuit of said closing discharge device for effecting closure of said circuit breaker, and means responsive to a predetermined condition of current flow in the plate circuit of said tripping discharge device for effecting opening of said circuit breaker.

19. In an alternating-current system of transmission and distribution, an alternating-current power circuit, an alternating-current power source for energizing said circuit, a circuit breaker included in said circuit, means for superimposing modulated carrier frequency energy upon said circuit, said carrier frequency energy having modulations of the same frequency as said power source, and control means responsive to a predetermined phase relationship of the transmitted power frequency voltage of said circuit and the modulations of the transmitted carrier frequency energy for effecting closure of said circuit breaker, said control means including an electronic device for detecting modulations of the transmitted carrier frequency energy.

20. In an alternating-current system of transmission and distribution, an alternating-current power circuit, an alternating-current power source for energizing said circuit, a circuit breaker included in said circuit, means for superimposing modulated carrier frequency energy upon said circuit, said carrier frequency energy having modulations of the same frequency as said power source, means for controlling the phase relationship of the modulations of said carrier frequency as compared to the voltage of said power source, and control means for said circuit breaker, said control means being responsive to a predetermined phase relationship of the transmitted power frequency voltage of said circuit and the modulations of transmitted carrier energy for effecting closure of said circuit breaker, and responsive to a different phase relationship of said transmitted power frequency voltage and the modulations of transmitted carrier energy for effecting opening of said circuit breaker, said control means including an electronic device for detecting modulations of the transmitted carrier frequency energy.

GEORGE O. HARRISON.